United States Patent [19]

Seyferth et al.

[11] Patent Number: 5,204,380
[45] Date of Patent: Apr. 20, 1993

[54] PREPARATION OF SILICON CARBIDE CERAMICS FROM THE MODIFICATION OF AN SI-H CONTAINING POLYSILANE

[75] Inventors: Dietmar Seyferth, Lexington, Mass.; Henry J. Tracy, Bath, Me.; Jennifer L. Robison, Cambridge, Mass.

[73] Assignee: Massachusetts Institute of Technology, Cambridge, Mass.

[21] Appl. No.: 751,190

[22] Filed: Aug. 29, 1991

[51] Int. Cl.$^5$ .............................................. C08J 3/28
[52] U.S. Cl. ..................................... 522/148; 522/91; 522/172; 528/14; 528/17; 528/19; 528/25; 528/31; 525/474; 525/475
[58] Field of Search ................... 528/31, 25, 14, 19, 528/17; 525/474, 475; 522/91, 148, 172

[56] References Cited

U.S. PATENT DOCUMENTS

| | | | |
|---|---|---|---|
| 3,108,985 | 10/1963 | Wever | 260/37 |
| 3,853,567 | 12/1974 | Verbeek | 106/44 |
| 3,892,583 | 7/1975 | Winter et al. | 106/55 |
| 4,310,651 | 1/1982 | Baney et al. | 528/21 |
| 4,312,970 | 1/1982 | Gaul, Jr. | 526/279 |
| 4,404,153 | 9/1983 | Gaul, Jr. | 521/154 |
| 4,482,669 | 10/1984 | Seyferth et al. | 524/442 |
| 4,537,942 | 8/1985 | Brown-Wensley | 528/12 |
| 4,611,035 | 9/1986 | Brown-Wensley | 525/474 |
| 4,639,501 | 1/1987 | Seyferth et al. | 525/474 |
| 4,645,807 | 2/1987 | Seyferth et al. | 525/474 |
| 4,650,837 | 3/1987 | Seyferth et al. | 525/478 |
| 4,705,837 | 10/1987 | Seyferth et al. | 528/31 |
| 4,719,273 | 1/1988 | Seyferth et al. | 528/15 |
| 4,720,532 | 1/1988 | Seyferth et al. | 528/28 |
| 4,767,876 | 8/1988 | Seyferth et al. | 556/410 |
| 4,780,337 | 10/1988 | Seyferth et al. | 522/60 |
| 4,820,783 | 4/1989 | Seyferth et al. | 525/474 |
| 4,906,710 | 3/1990 | Burns et al. | 525/475 |
| 5,070,116 | 12/1991 | Seyferth et al. | 522/148 |

OTHER PUBLICATIONS

Aitken et al. Can. J. Chem. 65, 1804 (1987).
Aiken et al., J. Organometallic Chem., 279, C11–C13 (1985).
J. Corey et al., Organometallics, 10, 924–930 (1991).
Harrod, Inorganic and Organometallic Polymers, ch. 7, 89–100 (1985).
Mu et al., Can. J. Chem., vol. 69, 264–276 (1991).
Penn et al., J. App. Polymer Sci., 27, 3751–61 (1982).
R. W. Rice, Amer. Ceram. Soc. Bull., 62, 889–892 (1983).
Zhang et al., J. Am. Chem. Soc., 74 (3), 670–73 (1991).
Nakano et al., Chem. Lett., 83 (1989).

Primary Examiner—Melvyn I. Marquis
Attorney, Agent, or Firm—George W. Neuner; Ronald I. Eisenstein; Peter F. Corless

[57] ABSTRACT

A method of forming modified preceramic polymers comprising mixing organopolysilanes having a plurality of Si—H functional groups with an effective amount of a metallocene compound, and allowing the mixture to undergo a dehydrogenative reaction is disclosed. Pyrolysis of the modified polymer provides in high yields ceramic residues that approach stoichiometric SiC in composition. Preferably the organopolysilane starting material contains a plurality of tertiary Si—H bonds and has the general formula of $[(RSiH)_x(RSi)_y]_n$ where the sum of the coefficients x and y equal 1, n is an integer greater than 1, R is a lower alkyl group having from 1 to about 8 carbon atoms, a substituted or unsubstituted lower alkenyl group having from 2 to about 8 carbon atoms, a cycloalkyl group having from 3 to about 10 carbon atoms, substituted or unsubstituted aryl group having from 6 to about 10 carbon atoms. More preferably R is a lower alkyl group having from 1 to about 8 carbon atoms, and still more preferably R is methyl so that the molar ratio of carbon to silicon of the polymer is about 1. The organopolysilanes can be prepared from silyl halides by alkali metal condensation reactions.

56 Claims, No Drawings

PREPARATION OF SILICON CARBIDE CERAMICS FROM THE MODIFICATION OF AN SI-H CONTAINING POLYSILANE

The Government has certain rights in this invention pursuant to Contract Number AFOSR-89-0400 awarded by the Air Force.

FIELD OF THE INVENTION

The present invention relates to a process for producing preceramic polymers which on pyrolysis can form ceramics in high yields and in preferred embodiments result in little free C or free Si. More particularly, the invention relates to dehydrogenative coupling of Si—H groups of polysilanes, including tertiary silicon hydrides, through use of metallocene catalysts.

BACKGROUND OF THE INVENTION

In recent years there has been a great deal of interest in preceramic polymeric materials which can serve as precursors, via their pyrolysis, for silicon-containing ceramics. R. W. Rice, *Amer. Ceram. Soc. Bull.*, 62, 889–892 (1983). Use of such polymers include among others: formation into complex shapes and subsequent pyrolysis to give a ceramic material of the same shape; spinning into continuous fibers whose subsequent pyrolysis yields ceramic fibers; as a matrix material for carbon or ceramic fibers, or as a binder for ceramic powders (with subsequent pyrolysis to form a ceramic body); oxidation-resistant coatings on otherwise oxidizable materials (such as carbon-carbon composites), after the polymer coating is made it can be pyrolyzed to give the resistant ceramic coating; infiltration of porous ceramic bodies such as ones obtained from reaction-sintered silicon nitride by the polymer itself (if liquid) or by a solution of the polymer with subsequent pyrolysis to form a ceramic resulting in better strength, oxidation resistance, etc. of the body; and formation of thin films for electronics applications. For example, Penn, et al., *J. App. Polymer Sci.*, 27, 3751–61 (1982) describe the preparation of silicon carbide-silicon nitride fibers from a polysilazane precursor. Other polymer precursors for forming silicon carbide and silicon nitride ceramics have been described in U.S. Pat. Nos. 3,108,985; 3,853,567; 3,892,583; 4,310,651; 4,312,970; 4,404,153 and 4,611,035. Seyferth, et al., in U.S. Pat. Nos. 4,650,837, 4,645,807, 4,639,501, 4,780,337, 4,767,876, 4,720,532, 4,705,532, 4,705,837, 4,719,273, 4,820,738 and 4,482,669 have disclosed new preceramic polymers whose pyrolysis results in good ceramic yields.

SiC-based ceramic fibers identified under the tradename Nicalon are currently commercially available and are prepared from preceramic polymers through a number of steps. Initially, a polydimethylsilane is prepared from the Na condensation of dimethyldichlorosilane. Upon heating to 450° C. in an autoclave, the polysilane is converted to a polycarbosilane through a Kumada-type rearrangement. The polycarbosilane contains a backbone of alternating Si and C atoms and consists of both cyclic and linear units. This polycarboxilane is both soluble and fusable and can be spun into fibers. Further processing of the fibers is generally required, as they do not retain their shape upon pyrolysis. Such processing has included oxidative curing of the "green" fibers at 350° C. before pyrolysis to give a mixture of SiC and $SiO_2$. The introduction of oxygen in the cure step contributes to the formation of the silica, although the $SiO_2$ can detract from the ceramic fiber's high temperature strength because of its lower crystallization temperature than SiC. In addition, high temperature reactions of $SiO_2$ with C or SiC can lead to the production of CO and SiO gases. These gases can reduce the ceramic strength by forming void spaces in the ceramic.

West, et al., *Am Ceram. Soc. Bull.*, 62, 899 (1983), reported synthesis of soluble polymethylsilane copolymers from the Wurtz coupling of $MePhSiCl_2$ and $Me_2SiCl_2$. Fibers produced from this "polysilastyrene", while not necessarily requiring an oxidative cure step, do generally require a UV irradiation cure to crosslink the fibers so that they retain their shape upon pyrolysis. The ceramic yield of the these fibers was reported to be only 15% at 1100° C. Baney, et al., *Organometallics*, 2, 859 (1983), reported production of an alternative silicon carbide precursor by the redistribution of methylchlorosilanes. This polymerization reaction, catalyzed by tetrabutylphosphonium chloride, was reported to yield polycyclic polymers of the formula $(Si_xMe_yCl_z)_n$ and methylchlorosilane monomers. The cyclic polymers are said to be converted into SiC with a 47% ceramic yield upon pyrolysis to 1200° C. Schilling and Kanner in European Patent Application 123,934; and *Chem. Abstr.*, 102:79465m, reported preparation of a polysilane from the Wurtz-coupling of $Me_3SiCl$ with the unsaturated halosilane, $ViMeSiCl_2$ in 36% yield. This polysilane, containing primarily $Me_3Si$ and MeSiVi groups, when pyrolyzed to 1200° C. was reported to give SiC in 38.5% ceramic yield.

More recently, Harrod, Laine, and others in *J. Am Ceram. Soc.*, 74, 670 (1991), reported that a polymethylsilane polymer can be synthesized by dehydrogenative coupling of methylsilane, $CH_3SiH_3$, with $Cp_2TiMe_2$. The soluble polymethylsilane was reported to provide a ceramic yield of 77% at 1000° C. with an average elemental analysis of $Si_1C_{0.9}H_{<0.2}O_{0.1}$. Large scale use of methylsilane may be undesirable, however, as the reagent is costly and a potentially dangerous gas, forming explosive mixtures with air.

The catalytic dehydrogenative polymerization of Si—H moieties by some group 4 metallocenes has been reported. See, for example, Aitken, et al., *J. Organomet. Chem.*, 279, C11 (1985); Harrod, *Inorganic and Organometallic Polymers*, ACS Symposium Series 360, ch. 7, Zeldin, et al., ed., (1988); Aitken, et al., *Organometallics*, 8, 1732 (1989); Laine, *Aspects of Homogeneous Catalysis*, vol. 7, p. 37–63, Ugo, R., ed., Kluwer Academic Publishers, Netherlands (1990). Generally, however, such reactions have worked well only with primary silanes. Relatively poor results have been reported for secondary Si—H groups, and tertiary silanes have been reported to be generally unreactive to such catalytic polymerization. As used herein, the term secondary Si—H group or secondary silane refers to as Si group that is bonded to only two hydrogen atoms and the term tertiary Si—H group or tertiary silane refers to a Si group that is bonded to only one hydrogen atom.

A polysilane has been reported, by T. G. Wood, Ph.D. disseration, Massachusetts Institute of Technology (1984), and in U.S. Pat. Nos. 4,537,942, 4,611,035, and 4,704,444. It has been found, however, that when this polysilane is pyrolyzed ceramic residues are provided in somewhat modest yields and the resulting ceramic can contain significant amounts of free silicon. As used herein, a polysilane is an organosilicon polymer whose backbone contains Si—Si bonds.

Excessive amounts of free silicon or free carbon is undesirable for a ceramic product. For example, elemental silicon has a melting point of 1410° C. Thus, the presence of a significant amount of free silicon limits high temperature applicability of a ceramic.

It would be desirable to have a preceramic polymer whose pyrolysis can provide a significantly higher yield of ceramic that contains little free silicon and/or little free carbon.

SUMMARY OF THE INVENTION

It has now been found that mixing organopolysilanes having a plurality of Si—H functional groups with an effective amount of a metallocene compound, and allowing such mixture to undergo a crosslinking dehydrogenative-type reaction, yields a modified polyorganosilicon material that upon pyrolysis provides ceramic residues in high yields. In preferred embodiments the ceramic can approach stoichiometric SiC in composition. Such residues are provided in high ceramic yields, for example, greater than 60 percent. Preferably the organopolysilane starting material contains a plurality of tertiary Si—H bonds and has the general formula $[(RSiH)_x(RSi)_y]_n$ where the sum of the coefficients x and y equal 1, n is an integer greater than 1, R is a lower alkyl group having from 1 to about 8 carbon atoms, a substituted or unsubstituted lower alkenyl group having from 2 to about 8 carbon atoms, a substituted or unsubstituted aryl group having from 6 to about 10 carbon atoms. More preferably R of the above formula is lower alkyl group having from 1 to about 8 carbon atoms, and still more preferably R is methyl so that the molar ratio of carbon to silicon of the polymer is about 1. These organopolysilanes are preferably prepared from silyl halides by alkali metal condensation reactions.

The dehydrogenative coupling reaction crosslinks the polysilanes with elimination of $H_2$ and formation of Si—Si bonds at active hydrogen sites, i.e. Si—H groups including tertiary Si—H groups. This is quite unexpected in view of prior reports where poor results were realized with secondary and especially with tertiary silanes.

As used herein, the term "modified" organopolysilane, polysilane, polymer, or preceramic polymer material refers to the polymer product of the dehydrogenative crosslinking reaction of the invention.

DETAILED DESCRIPTION OF THE INVENTION

We have now discovered that mixing organopolysilanes having a plurality of Si—H functional groups with an effective amount of metallocene compound, and allowing such mixture to undergo a dehydrogenative coupling-type reaction to increase crosslinking, yields a modified polyorganosilicon material that upon pyrolysis provides a ceramic residue in high yield.

The organopolysilane starting material preferably contains a plurality of tertiary Si—H bonds and has the formula of $[(RSiH)_x(RSi)_y]_n$ where the sum of the coefficients x and y equal 1, n is an integer greater than 1, R is a lower alkyl group having from 1 to about 8 carbon atoms, a substituted or unsubstituted lower alkenyl group having from 2 to about 8 carbon atoms, a substituted or unsubstituted cycloalkyl having from 3 to about 10 carbon atoms, a substituted or unsubstituted aryl group having from 6 to about 10 carbon atoms. More preferably R of the above formula is a lower alkyl group having from 1 to about 8 carbon atoms, and still more preferably R is methyl so that the molar ratio of carbon to silicon of the polymer is about 1 and results in a preceramic polymer that upon pyrolysis provides a ceramic that approaches stoichiometric SiC in composition. Suitable substituents can be one or more lower alkyl groups, lower alkenyl groups or halogen. The coefficient x of the above formula preferably has a value of from about 0.3 to 1.0 and the coefficient y has a value of from about 0.7 to 0; more preferably the coefficient x has a value of from about 0.6 to 0.9 and the coefficient y has a value of from about 0.4 to 0.1; and still more preferably the coefficient x has a value of from about 0.60 to 0.80 and the coefficient y has a value of from about 0.40 to 0.20. In the organopolysilane of the above formula, each Si atom in a (RSiH) unit is bonded to two other Si atoms, and each Si atom in a (RSi) unit is bonded to three other Si atoms.

The organopolysilanes are preferably prepared from silyl halides by Wurtz-type alkali metal condensation reactions. A preferred alkali metal is sodium or potassium, more preferably sodium. Organopolysilanes that can be employed in the process of the invention include the alkali metal condensation products of compounds of the formula $R^1SiHCl_2$; the alkali condensation products of mixtures of compounds of the formulas $R^1SiHCl_2$ and $R^2SiHCl_2$; the alkali condensation products of mixtures of compounds of the formulas $R^1SiHCl_2$ and $(R^2)_2SiCl_2$; and the alkali condensation products of mixtures of compounds of the formulas $R^1SiHCl_2$, $R^2SiHCl_2$ and $(R^2)_2SiCl_2$, where $R^1$ is a substituted or unsubstituted lower alkyl having from 1 to about 8 carbon atoms, substituted or unsubstituted lower alkenyl having from 2 to about 8 carbon atoms, and substituted or unsubstituted aryl having from 6 to about 10 carbon atoms. $R^2$ is defined the same as $R^1$ and may be the same as or different than $R^1$. Further, in compounds of the formula $(R^2)_2SiCl_2$, the two $R^2$ groups may be taken together to form a silicon-containing ring having from 2 to about 7 methylene groups. Preferably $R^1$ and $R^2$ each is a lower alkyl group having from 1 to about 8 carbon atoms. A particularly preferred embodiment is where $R^1$ and $R^2$ are each methyl groups. The substituents can be one or more lower alkyl groups, alkenyl groups, aryl groups or halogen.

It is believed that a polysilane starting material having sufficient Si—H repeat units, such as the above described organopolysilane condensation products, are necessary to produce a modified preceramic polymer which on pyrolysis forms an Si—C ceramic in good yield with little elemental silicon.

In the process of the invention, these organopolysilanes are reacted with an effective amount of a metallocene catalyst. Suitable metallocene compounds for use int he process include compounds of the formulas $(R^3_nC_5H_{5-n})_2M'R^4$; $(R^3_nC_5H_{5-n})_2M''R^5R^6$; and $(R^3_nC_5H_{5-n})_2V$, where each $R^3$ substituent on a cyclopentadienyl ring is independently hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, aryl or substituted aryl of from 6 to about 10 carbon atoms, and a group of formula $R'_3Si$ where each R' group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, and aryl or substituted aryl having from 6 to 10 carbon atoms, or two adjacent $R^3$ groups taken together form an aromatic ring fused to the $C_5H_{5-n}$ cyclopentadienyl ring; $R^4$, $R^5$ and $R^6$ are each independently hydrogen, halogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 1 to about 8 carbon atoms, substituted or unsubstituted aryl having from about 6 to about 10 carbon atoms, benzyl having from 7 to about 11 carbon atoms, substituted benzyl having from 7 to about 11 carbon atoms and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 1 to about 8 carbon atoms, and substituted or unsubstituted aryl having from about 6 to about 10 carbon atoms; $M'$ is selected from the group of Ti, Zr, Sc, Y and a lanthanide metal, i.e., La, Ce, Pr, Nd, Pm, Sm, Eu, Gd, Tb, Dy, Ho, Er, Tm, Yb, and Lu; and $M''$ is selected from the group of Ti, Zr and Hf. The value n suitably is an integer form 0 to 5, and preferably n is 0 or 1. Preferably when two $R^3$ groups are taken together to form a ring, the two $R^3$ groups form a 6-membered aromatic ring fused to the cyclopentadienyl ring to provide an dienyl group. By stating that each $R^3$ substituent on a cyclopentadienyl ring is independently selected from the specified group, it is intended that $R^3$ can be up to five (i.e., n=5) of the same or different moieties on a single ring.

Preferred metallocene compounds include $(\eta-C_5H_5)_2Ti(CH_3)_2$, $(\eta-C_5H_5)_2Zr(CH_3)_2$, $(\eta-C_5H_5)_2Zr(n-C_4H_9)_2$, $(\eta-C_5H_5)_2Hf(CH_3)_2$, $[(\eta-C_5H_5)_2ZrH_2]_n$ (where n is suitably an integer of from 1 to about 5) and $(\eta-C_5H_5)_2ZrHCl$.

A preferred metallocene catalyst of the formula $R^3{}_nC_5H_{5-n}Zr(R^7)_2$ where $R^3$ and n are groups as defined above and $R^7$ is a lower alkyl and preferably is butyl, can be prepared by treatment of the dihalo compound of the formula $R^3{}_nC_5H_{5-n}Zr(halogen)_2$ where $R^3$ is as defined above and n is from 0 to 5, with an alkyllithium reagent to generate the catalyst in situ prior to the dehydrogenation reaction. The halogen group of the precursor is suitably chloride. See J. Y. Corey, et al., *Organometallics*, 10, 924 (1991). The alkyl group of the lithium reagent is the same as $R^7$. For example, to generate the catalyst where $R^7$ is butyl, the dihalo precursor is treated with butyllithium. Other suitable catalysts can be prepared by procedures known in the art. Some of the catalysts useful in the dehydrogenative reaction of the invention are commercially available.

Effective catalysis of the dehydrogenative crosslinking reaction of the invention can be achieved if between about 0.20 and 3.0 mole percent of the metallocene compound is employed. Moreover, it has been found that a modified polymer will produce a ceramic in higher yields if the amount of the metallocene compound is in the range of from about 0.40 to 2.0 mole percent of the organopolysilane, preferably from about 0.45 to 1.75 mole percent, and more preferably the amount of the metallocene compound is in the range of from about 0.50 to 1.5 mole percent of the organopolysilane.

The dehydrogenative crosslinking reaction is preferably carried out in an organic solvent. One can use any organic solvent in which the polysilane is soluble. A variety of solvents are suitable including paraffinic hydrocarbons such as pentane and hexanes as well as aromatic hydrocarbons such as benzene, toluene and xylenes. Generally preferred are solvents which provide a relatively mild reflux temperature, e.g., between about 60° C. and 75° C., so that degradation of the preceramic polymer during the crosslinking reaction is minimized. Suitable solvents can readily be determined by the skilled artisan based upon the constituents being used. For example, with the dehydrogenative crosslinking catalyst $(Cp_2ZrH_2)_n$, hexane is a preferred solvent giving solid modified polysilanes under various reaction conditions. This zirconocene species is initially insoluble in hexane, but solubilizes after prolonged stirring at room temperature or reflux with the organopolysilane and turns the solution yellow-orange. While not wishing to be bound by theory, this color change may indicate the formation of Zr—Si species.

The dehydrogenative crosslinking reaction of the invention can be initiated by a number of means. For example, thermolysis may be employed to induce crosslinking. Exemplary thermolysis conditions include heating the reaction mixture at reflux for 20 minutes to 3 hours, the specific heating period varying with the specific polysilane and metallocene species employed. Photolysis is another suitable method for inducing metallocene-catalyzed crosslinking of Si—H groups of the polysilane. Photolysis may be suitably conducted by exposing the reaction mixture to activating radiation, preferably, ultraviolet (UV) radiation, for a time sufficient to complete the crosslinking reaction. It has also been found that the Si—H groups of polysilanes will undergo crosslinking in the presence of a metallocene catalyst by stirring an admixture of the same at room temperature for 0.5 to 24 hours or more.

Optimal conditions for the crosslinking reaction of the invention can be determined empirically by those skilled in the art based on the disclosure herein. It has found that when a catalyst of $Cp_2ZrMe_2$ is employed with a polysilane, photolysis, rather than thermolysis as in the case of $(Cp_2ZrH_2)_n$, in hexane appears to be the most effective means for crosslinking the polysilane. During photolysis the reaction mixture slowly turns an orange color which may indicate formation of Zr—Si species. For $Cp_2ZrHCl$, thermolysis in toluene (in which $Cp_2ZrHCl$ is soluble) gave the best results. This reaction mixture begins to turn orange immediately upon heating. When the catalyst $Cp_2TiMe_2$ is employed, room temperature and thermolysis reactions are preferably run in the dark. In thermolysis and photolysis reactions where this catalyst was employed, the reaction mixtures turned from right orange (believed due to $Cp_2TiMe_2$) to dark green. While again not wishing to be bound by theory, this color change to dark green could be due to the formation of $[(Cp_2TiH)_2H]$ and other silyl-titanium species. In room temperature reactions where the concentration of $Cp_2TiMe_2$ was between $1 \times 10^{-2}$ and $2 \times 10^{-2}$M, the reaction mixtures remained orange after stirring for 24 hours. When solvent was removed by vacuum trap distillation, however, the reaction mixtures turned dark green. This color change indicates that concentration affects the reactivity of $Cp_2TiMe_2$ with the polysilane. Additional support for this conclusion was provided by a reaction where the $Cp_2TiMe_2$ concentration was increased to approximately $2\times 10^{-1}$M and the solution turned from orange to dark green almost immediately.

The polysilane prepared from the Wurtz coupling of MeHSiCl$_2$ and PhHSiCl$_2$ was examined. This phenyl, methyl-polysilane, a milky white oil, is represented by the formula (MeSiH)$_x$(MeSi)$_y$(PhSiH)$_z$(PhSi)$_w$, where the coefficients x and z represent the unchanged units of the polymer, and y and w represent the crosslinked units in the polymer, and the sum of the coefficients, x, y, z, and w equal one. These coefficients can be determined from integration of the MeSiH, PhSiH, MeSi, and PhSi regions in the $^1$H NMR. The MeSiH and PhSiH regions in the $^1$H NMR do overlap slightly, making discrete integration of the regions somewhat difficult. Assignment of the coefficients can be, therefore, somewhat inexact.

The phenyl, ethyl-polysilane typically employed had the formula (MeSi)$_{0.52}$(MeSi)$_{0.29}$(PhSiH)$_{0.10}$(PhSi)$_{0.08}$. The ceramic yield of this polysilane prior to the dehydrogenative crosslinking reaction of the invention (as determined by thermogravimetric analysis) was in several reactions between 33 and 36 percent. In order to determine the effects that thermolysis and photolysis have on this polysilane, in the absence of any catalyst, samples of the polysilane were separately thermolyzed and photolyzed in hexane for 2 hours. Thermolysis produced a milky white oil whose pyrolysis gave a ceramic yield of 45 percent, and photolysis produced a milky white oil whose pyrolysis gave a ceramic yield of 42 percent. Both thermolysis and photolysis of the phenyl, methyl-polysilane in the absence of a suitable metallocene catalyst result in products with only slightly enhanced ceramic yields.

In reactions of the above described phenyl, methyl-polysilane in combination with (Cp$_2$ZrH$_2$)$_n$ in hexane, the reaction mixtures became clear and orange upon heating to reflux, indicating formation of Zr—Si species as discussed above. The resulting modified polymers were viscous orange oils, with moderate increases ceramic yields relative to a unmodified phenyl, methyl-polysilane. Calculation of the coefficients from the integration of the $^1$H NMR spectra of the modified polymers reveals that a slight loss of linear MeSiH units has occurred, with a corresponding increase in crosslinked MeSi units, but that the amount of linear PhSiH and crosslinked PhSi units are substantially unchanged. Thus it appears that dehydrogenation resulting in crosslinking has occurred primarily at the (MeSiH) units of the polysilane. This suggests that the rate of dehydrocoupling of the silane groups decreases as steric bulk of the polymer is increased. Considering steric factors of this polysilane, the rate of dehydrocoupling should, therefore, be greater for the (MeSiH) units than for the (PhSiH) units.

In the reactions of the phenyl, methyl-polysilane with Cp$_2$ZrMe$_2$, the reaction mixtures became orange upon UV irradiation in either hexane or toluene. The resulting modified polymers were orange oils with moderately higher ceramic yields. In the reactions of the phenyl, methyl-polysilane with Cp$_2$ZrHCl, the mixtures became faint orange upon heating to reflux. Upon cooling and removal of solvents, the orange color faded, resulting in a milky white oil and a faint orange oil for the modified polymers. The ceramic yields for these modified polymers were only somewhat increased to about 39 to 44 percent. For the modified polymer produced in Example 39 which follows, the proton NMR reveals a slight loss of linear MeSiH and PhSiH units, with corresponding increase the crosslinked MeSi and PhSi units.

The dehydrogenative crosslinking reaction of the invention preferably is conducted under an inert atmosphere such as argon or nitrogen so that the reaction is substantially free of oxygen and moisture.

In analyzing the crosslinking reactions of the invention, standard means can be used, such as proton NMR and thermogravimetric analysis. From the proton NMR spectra of the modified polysilanes, the change in the coefficients of the subunits of the polymer, and thus the degree of crosslinking achieved, can be readily determined. For a phenyl, methyl-polysilane, a quantitative picture of the degree of crosslinking of the modified polymer can be difficult through integration of the proton NMR spectra and, hence, the ceramic yield of the modified polymer is, perhaps, a more accurate indicator of the degree of crosslinking in these systems. Evidence of networking or crosslinking of the polysilanes is also provided by an increase in molecular weight of the modified polymer in comparison to the starting polysilane. Molecular weights of the modified polymers can be conveniently determined by cryoscopy in benzene. It has also been found that the dehydrogenative crosslinking reaction will change the polymer from an oil to a solid.

This can be desirable to further crosslink the polysilane after the catalytic dehydrogenative reaction. For example, a modified polysilane can be cured by exposure to activating radiation such as ultraviolet radiation to crosslink remaining Si—H functionalities. Such a cure step can contribute to fibers of the modified polymer retaining their shape upon pyrolysis.

The modified polymer can be pyrolyzed in a nitrogen or inert gas atmosphere for a sufficient time and at a sufficient temperature to form a ceramic product.

The methods described herein generally result in the formation of preceramic polymers in virtually quantitative yields. Pyrolysis of the resulting preceramic polymers provides ceramic yields that are generally 60% or more. For example, in the Table below, modified polysilanes prepared by the methods of the specified Example Number (where such Examples follow) were pyrolyzed, in bulk, under argon in a tube furnace to 1500° C. As shown in the Table, these modified polysilanes gave bulk ceramics in 65% to 79% yield upon pyrolysis with low free Si or C whereas a base polysilane that was not subjected to the dehydrogenative reaction of the invention provided a ceramic in a yield of 20% with a comparatively high elemental silicon content.

As noted, when a preceramic polymer modified in accordance with the invention is pyrolyzed, the resultant ceramic has little free silicon. Thus, one can obtain a ceramic product with less than about 10.0 mole percent of free silicon including ceramics with less than about 8.0 mole percent of elemental silicon, preferably less than about 6.0 mole percent, still more preferably less than about 3.0 mole percent of elemental silicon and even still more preferably less than 1.0 mole percent, i.e., ceramics substantially free of elemental silicon or carbon. For example, in the Table below, the elemental analysis and X-ray diffraction (XRD) of the samples show that the resulting ceramics contain nearly pure SiC with small amounts of MC (M=Zr or Ti) and Si. In the XRD patterns of these modified polymers, the d-spacings for at least five of the reflections matched those of SiC. Additionally, four reflections corresponding to ZrC were observed for ceramic of Example 13. The ceramics were analyzed for C, H, Si and M and the results obtained from the elemental analyses are expressed below as weight percentages as determined by the method described in the general comments which follow.

TABLE

Bulk pyrolysis of modified polysilanes to 1500° C.

| Example Number | Ceramic Yield | XRD (Phases) | Ceramic Analysis |
|---|---|---|---|
| 1 | 72% | SiC | 98.0% SiC |
|  |  |  | 1.6% ZrC |
|  |  |  | 0.4% Si |
| 2 | 70% | SiC | 92.2% SiC |
|  |  |  | 1.5% ZrC |
|  |  |  | 6.3% Si |
| 12 | 78% | SiC | 91.4% SiC |
|  |  |  | 3.1% ZrC |
|  |  |  | 5.5% Si |
| 13 | 79% | SiC | 93.3% SiC |
|  |  | ZrC | 5.6% ZrC |
|  |  |  | 1.0% Si |
| 18 | 71% | SiC | 96.6% SiC |
|  |  |  | 1.7% ZrC |
|  |  |  | 1.7% Si |
| 24 | 71% | SiC | 95.4% SiC |
|  |  |  | 1.8% TiC |
|  |  |  | 2.8% Si |
| 25 | 65% | SiC | 86.5% SiC |
|  |  |  | 3.2% TiC |
|  |  |  | 10.3% Si |
| Base Polysilane | 20% | SiC Si | 74% SiC 26% Si |

The effect of thermolysis and photolysis on a polysilane in the absence of a metallocene catalyst was investigated. Samples of a polysilane of the formula $[(CH_3SiH)_{0.65}(CH_3Si)_{0.35}]_n$ were separately thermolyzed and photolyzed in hexane for 2 hours. Thermolysis produced a milky white oil (where s=0.60 and y=0.40) with a ceramic yield of 24%. Photolysis produced a milky white oil (where x=0.61 and y=0.39) with a ceramic yield of 33%. Thus, while some changes were observed for the coefficients x and y, neither thermolysis nor photolysis in the absence of a suitable catalyst results in products with dramatically higher ceramic yields.

The following examples are presented to better illustrate the invention, but are not to be construed as limiting the invention to the specific embodiments disclosed.

GENERAL COMMENTS

Throughout the Examples, all reactions and manipulations were carried out under an atmosphere of prepurified nitrogen or argon using standard Schlenk techniques or a Vacuum Atmospheres dry box. Hexane was distilled under nitrogen from $LiAlH_4$. Tetrahydrofuran, diethyl ether, and benzene were distilled under nitrogen from sodium benzophenone ketyl. Toluene was distilled under nitrogen from sodium. $Me_2SiCl_2$ was purchased from either Silar, Inc. of Huls America and distilled under nitrogen or argon from Mg turnings before use. $(Cp_2ZrH_2)_2$, $Cp_2ZrMe_2$ and $Cp_2TiMe_2$ were prepared according to literature methods. Wailes, et al., *Inorg. Syn.*, 19, 223 (1979); Samuel, et al., *J. Am. Chem. Soc.*, 91, 6263 (1973); Piper, et al., *J. Inorg. Nucl. Chem.*, 3, 104 (1956). $Cp_2ZrHCl$ was purchased from Aldrich Chemical Company, Inc. and used without further purification. Room temperature is sometimes designated herein as RT.

In the photolysis experiments, Hanovia medium pressure mercury lamp (140 watts, $\lambda > 300$ nm) was placed between 5 and 10 cm from the quartz reaction flask. Proton NMR spectra were obtained on a Bruker WM-250 (250 Mhz) or a Varian XL-300 (300 MHz) using $C_6D_6/C_6H_6$ as a reference at 7.15 ppm downfield from tetramethylsilane. Ceramic analysis were performed by Galbraith Laboratories, Knoxville, Tennessee. The calculated ceramic compositions were made using the assumption that all carbon, hydrogen, silicon, zirconium, and titanium were accurately accounted for in the elemental analysis. This was not always the case, as analysis did not add up to exactly 100%. This in fact, is common for ceramic analysis, including those reported elsewhere in the literature.

Thermogravimetric analysis (TGA) of samples was performed using a Perkin-Elmer TGS-2 system under a 40 ml/min argon flow. Samples were heated from 50° to 945° C. at 10°/min., unless otherwise noted. TGA yields are reported as the percentage of the sample that remains after the heating cycle is complete. A few samples exhibited bubbling at temperatures greater than 900° C. which caused expulsion of part of the sample from the TGA pyrolysis boat. This expulsion of material resulted in TGA yields that did not reflect the true ceramic yield of the material, and thus the ceramic yields for these samples were determined before such loss of material. Large scale tube furnace pyrolyses were performed in a graphite boat in a Lindberg Model 59545 tube furnace equipped with a Eurotherm Model E5 controller and a mullite tube. Boats were placed on a 6" $Al_2O_3$ dee tube inside the mullite tube. The furnace was initially purged with argon for 30 minutes before the sample was introduced, then purged for 15 to 30 minutes after the sample was introduced before the heating cycle was begun. The following temperature program was employed: 25° to 1000° C. at 10°/min., hold for 2 hours, then 1000° to 1500° C. at 5°/min., hold for 5 hours.

Molecular weights were determined using the technique of cryoscopy in benzene. A small pyrex tube was fitted with a rubber septum through which a thermometer, graduated in 0.02° C. increments, was inserted. A weighed amount of sample was placed in the tube and a weighed amount of benzene was added. The freezing point of the solution was measured in a water/ice bath and compared to the freezing point determined for pure benzene to give $\Delta T$. The molecular weight was then determined from the following equation:

$$\text{molecular weight} = \frac{(5120)(\text{g of sample})}{(\text{g of benzene})(\Delta T)}$$

X-ray powder diffraction data were obtained on ceramic samples using a Rigaku 300 rotating anode diffractometer with $CuK\alpha$ ($\lambda = 1.5418$ Å) radiation and a Ni filter. A $2\Theta$ range of 20° to 130° C. was scanned for each sample. Identification of the crystalline phases in the powder diffraction pattern was made by comparison to d-spacings from literature sources.

The following procedure was used to determine the composition of the ceramics. The percentages of M, C and Si obtained from elemental analyses were converted to molar amounts where x=molar amount of M (M=Zr or Ti), y=molar amount of carbon, and z=molar amount of silicon. The following equation was used to determine the relative molar amounts of Mc, SiC and excess Si:

$(x)MC + (y-x)Sic + [z-(y-x)]Si$

The resulting molar amounts of MC, SiC, and Si were then converted to weight percentages.

A. Preparation of Polysilane of formula $[(MeSiH)_x(MeSi)_y]_n$

In all the examples, the unmodified term "polysilane" refers to a polysilane of the above formula $[(MeSiH)_x(MeSi)_y]_n$ and the coefficients x and y as specified. The coefficients x and y are determined from integration of the Si—H and Si—CH$_3$ regions of the proton NMR spectra of the polysilane. The sodium used in this procedure was cleaned by melting it in refluxing xylene, decanting away the xylene while under a heavy purge of argon, and drying on a schlenk line overnight. This cleaned sodium was cut into small pea-sized pieces in the dry box with a pair of scissors. A 1 liter three-necked, round-bottomed flask with a magnetic stir-bar, rubber septum, additional funnel, and reflux condenser with a gas inlet tube was charged with 37.5 g (1.63 mol) of pea-sized sodium. To the reaction mixture was added 210 ml of freshly distilled hexane and 35 ml of freshly distilled tetrahydrofuran. Freshly distilled methyldichlorosilane (75 ml, 0.72 mol) was transferred by cannula to the addition funnel and the chlorosilane was added dropwise over 3 hours. After approximately 15 minutes, the solution turned blue and the reaction mixture became warm. After the addition was complete, the now cloudy, blue mixture was stirred at room temperature for 2 hours. Stirring was discontinued and the reaction mixture was warmed to a gentle reflux for 20 hours. After cooling to room temperature, the reaction mixture was filtered over a Schlenk frit, washing the salts and excess sodium three times with 40 ml portions of a hexane/tetrahydrofuran mixture of 7:1 (v/v). The volatiles were removed by trap-to-trap distillation (room temperature; 0.05 mm Hg) with continued drying for 2 days to give a mobile, white, cloudy liquid in 71% yield.

$^1$H NMR (300 MHz, C$_6$D$_6$): $\delta_H$ 0 to 1.1 (broad, 4.43 H, SiCH$_3$), 3.6 to 4.4 (broad, 1.0 H, SiH). Calculated formula of $[(MeSiH)_{0.68}(MeSi)_{0.32}]$.

Ceramic Yield (by TGA): 24% yield, black ceramic.

B. Preparation of polysilane of formula $(MeSiH)_x(MeSi)_y(PhSiH)_z(PhSi)_2$

The sodium used in this procedure was cleaned by melting it in refluxing xylene, decanting away the xylene while under a heavy purge of argon, and drying on a Schlenk line overnight. This cleaned sodium was cut into small pea-sized pieces in the dry box with a pair of scissors. A 1 liter three-necked, round-bottomed flask with a magnetic stir-bar, rubber septum, addition funnel, and reflux condenser with a gas inlet tube was charged with 45 g (1.96 mol) of pea-sized sodium. To the reaction mixture was added 400 ml of freshly distilled hexane and 57 ml of freshly distilled tetrahydrofuran. Freshly distilled methyldichlorosilane (77.5 ml, 0.744 mol), phenyldichlorosilane (22.5 ml, 0.154 mol), and tetrahydrofuran (50 ml) were transferred by cannula to the addition funnel and the mixture was added dropwise over 1 hour. After approximately 45 minutes, the solution turned blue and the reaction mixture became warm. After the addition was complete, stirring was discontinued and the reaction mixture was warmed to a gentle reflux for 20 hours. After cooling to room temperature, the reaction mixture was filtered over a Schlenk frit, washing the salts and excess sodium three time with 40 ml portions of a hexane. The volatiles were removed by trap-to-trap distillation (room temperature; 0.05 mm Hg) with continued drying for 24 hours to give a mobile, white, cloudy liquid of the title compound in 63% yield.

$^1$H NMR (300 MHz, C$_6$D$_6$): $\delta_H$ 0.3 to 1.1 (broad, 38.2 H, SiMe), 3.2 to 4.45 (broad, 7.9 H, MeSiH), 4.45 to 5.2 (broad, 1H, PhSiH), 6.8 to 8.0 (two broad peaks, 12.6 H, SiPh). Calculated formula of $[(MeSiH)_{0.52}(MeSi)_{0.29}(PhSiH)_{0.10}(PhSi)_{0.08}]$ Ceramic Yield (by TGA): 34-36% yield (to 950° C.), black ceramic C. Standard Procedure for Thermolysis Reactions In a nitrogen filled dry box a 50 or 100 ml Schlenk flask equipped with a stir bar and a rubber septum was loaded with the polysilane and the catalyst. The flask was then evacuated and backfilled with argon on a Schlenk line and solvent was added. While under a heavy flow of argon, the septum was replaced with a teflon sleeve and a purged reflux condenser equipped with a gas inlet tube connected to an oil bubbler. The reaction mixture was heated to a vigorous reflux from 20 minutes to 3 hours. After thermolysis was complete the reaction mixture was cooled to room temperature. The solvent was then removed by trap-trap distillation at room temperature (0.05 mm Hg). The residue was dried at room temperature for 24 to 48 hours.

D. Standard Procedure for UV Photolysis Reactions

In a nitrogen filled dry box a quartz flask equipped with a stir bar and either a rubber septum or a reflux condenser with a gas inlet tube was loaded with the polysilane and the catalyst. The flask was then evacuated and backfilled with argon on a Schlenk line, and solvent was added to form a solution approximately 0.9M in polysilane. While connected to an oil bubbler the flask was irradiated with a medium pressure photolysis lamp from approximately 5 to 10 cm away. During photolysis the flask warmed slightly. After photolysis was complete, the solvent was removed by trap-to-trap distillation at room temperature (0.05 mm Hg). The residue was dried at 50° C. for 1 hour and then at room temperature for 24 to 48 hours.

EXAMPLE 1

Thermolysis reaction of 0.57 mol % (Cp$_2$ZrH$_2$)$_n$ in hexane.

The standard thermolysis procedure was carried out as generally described in the general comments above using the following reactants in the indicated amounts:

$^1$H NMR (300 MHz, C$_6$D$_6$): $\delta_H$ 0 to 1.1 (broad, 5.7 H, SiCH$_3$), 3.6 to 4.4 (broad, 1.0 H, SiH), 5.87, 5.95 (0.08 H, CpZr). Calculated formula of $[(HMeSi)_{0.53}(MeSi)_{0.47}]$.

Ceramic Yield (by TGA): 74% yield, black ceramic.

A large scale tube furnace pyrolysis, employing the temperature program described in the general comments above, of 0.379 g of orange solid produced 0.273 g (72% yield) of a black ceramic.

Ceramic Analysis: C, 29.89, H, <0.5; Si, 69.90; Zr, 1.48.

Equivalent to 98.0% Sic+1.6% Zrc+0.4% Si

XRD (d, Å): 2.52, 2.18, 1.54, 1.32, 1.00, 0.89 ($\beta$-SIC) 2.57, 2.48 (weak, unknown)

Fibers were pulled from a hexane solution of the modified polysilane using a metal spatula in a nitrogen filled dry box. The fibers were placed on a silica pyrolysis boat which was then placed in a quartz tube that was sealed off at each end with a rubber septum. The fibers were then photolyzed for 1.5 hours. The UV "cured"

fibers were then pyrolyzed to 1000° C. (at 10°/minutes, holding for 4 hours at 1000° C.) to give 67% yield (based upon hexane containing fibers) of black ceramic fibers.

EXAMPLE 2

Thermolysis reaction of 0.54 mol % $(Cp_2ZrH_2)_n$ in hexane.

The standard thermolysis procedure was carried out as generally described in the general comments above using the following reactants in the indicated amounts:
4.04 g (92.3 mmol) polysilane (x=0.64, y=0.36)
0.118 g (0.50 mmol) $(Cp_2ZrH_2)_n$
150 ml hexane The reaction mixture (in a 100 ml three-necked, round-bottomed flask equipped with magnetic stir bar, reflux condenser with gas inlet tube, and two septa) was warmed to a vigorous reflux for 2 hours, during which time the solution became clear and orange. After drying, 4.16 g (100% yield based upon the weight of the reactants) of an orange solid was obtained.

$^1$H NMR (300 MHz, $C_6D_6$): $\delta_H$ 0 to 1.1 (broad, 5.8 H, SiCH$_3$), 3.6 to 4.4 (broad, 1.0 H, SiH), 6.00 (s, too small to integrate, CpZr). Calculated formula of [(HMeSi)$_{0.53}$(MeSi)$_{0.48}$].

Ceramic Yield (by TGA): 81% yield, black ceramic.

A large scale tube furnace pyrolysis (in a boron nitride boat), employing the temperature program described in the general comments above, of 0.331 g of orange solid produced 0.232 g (70% yield) of a black ceramic.

Ceramic Analysis: C, 27.41 H, >0.5; Si, 70.35; Zr, 1.29.

Equivalent to 92.2% Sic+1.5% ZrC+6.3% Si
XRD (d, Å): 2.53, 2.18, 1.54, 1.32, 0.98, 9.89 (β-SiC) 3.16, 2.62, 1.93 (weak, unknown).

Fibers were prepared as described above in Example 1, but were not exposed to UV irradiation. These fibers did not retain their shape upon pyrolysis.

EXAMPLES 3-11

By procedures similar to those employed in Examples 1 and 2 above and as specified in Table 1 below, the following reactions were conducted:

EXAMPLE 12

Photolysis reaction of 0.96 mol % $(Cp_2ZrH_2)_n$ in hexane.

The standard photolysis procedure was carried out as generally described in the general comments above using the following reactants in the indicated amounts:
0.82 g (18.7 mmol) polysilane (x=0.65, y=0.35)
0.046 g (0.18 mmol) $Cp_2ZrMe_2$
20 ml hexane The reaction mixture (in a 100 ml flask with a septum) was irradiated for 2 hours during which time the solution became clear and orange. After drying, 0.881 g (102% yield based upon the weight of the reactants) of a dark orange-brown solid was obtained.

$^1$H NMR (300 MHz, $C_6D_6$): $\delta_H$ 0 to 1.1 (broad, 5.26 H, SiCH$_3$), 3.6 to 4.4 (broad, 1.0 H, SiH), 6.0 to 6.2 (s, too small to integrate, CpZr). Calculated formula of [(MeSiH)$_{0.57}$(MeSi)$_{0.43}$].

Ceramic Yield (by TGA): 85% yield, black ceramic

A large scale tube furnace pyrolysis, employing the temperature program described in the general comments above, of 0.272 g of orange solid produced 0.212 g (78% yield) of a black ceramic.

Ceramic Analysis: C, 27.08; H, <0.5; Si. 67.86; Zr, 2.70.

Equivalent to 91.4% SiC+3.1% ZrCp30 5.5% Si
XRD (d, Å): 2.53, 2.18, 1.54, 1.32, 1.00, 0.89 (β-SiC)

EXAMPLE 13

Photolysis reaction of 0.64 mol % $(Cp_2ZrH_2)_n$ in hexane.

The standard photolysis procedure was carried out as generally described in the general comments above using the following reactants in the indicated amounts:
0.69 g (15.8 mmol) polysilane (x=0.65, y=0.35)
0.065 g (0.26 mmol) $Cp_2ZrMe_2$
18 ml hexane The reaction mixture (in a 50 ml flask with a septum) was irradiated for 2 hours during which time the solution became nearly clear and orange. After drying, 0.771 g (102% yield based upon the weight of the reactants) of a dark orange-brown solid was obtained.

$^1$H NMR (300 MHz, $C_6D_6$): $\delta_H$ 0.to 1.1 (broad, 5.0 H, SiCH$_3$), 3.6 to 4.4 (broad, 1.0 H, SiH), 5.7 to 6.3 (m, 0.29

TABLE 1

Modification of (MeSiH)$_x$(MeSi)$_y$ with $(Cp_2ZrH_2)_n$.

| Example Number | Starting Coefficients | Mole % Catalyst | Solvent | Conditions | Product | End Coefficients | Ceramic Yield (by TGA)$^a$ |
|---|---|---|---|---|---|---|---|
| 3 | x = 0.63<br>y = 0.37 | 0.37 | Et$_2$O | reflux<br>30 min. | yellow<br>oil | x = 0.55<br>y = 0.45 | 23% |
| 4 | x = 0.63<br>y = 0.37 | 0.38 | THF | reflux<br>30 min. | yellow<br>oil | x = 0.66<br>y = 0.34 | 31% |
| 5 | x = 0.64<br>y = 0.36 | 0.14 | hexane | reflux<br>30 min. | yellow<br>wax | x = 0.61<br>y = 0.39 | 40% |
| 6 | x = 0.65<br>y = 0.35 | 0.48 | hexane | RT<br>16 hr. | yellow<br>solid | x = 0.46<br>y = 0.56 | 67% |
| 7 | x = 0.65<br>y = 0.35 | 0.47 | hexane | reflux<br>2 hr. | orange<br>solid | x = 0.51<br>y = 0.49 | 62% |
| 8 | x = 0.64<br>y = 0.36 | 1.0 | hexane | reflux<br>30 min. | orange<br>solid | x = 0.54<br>y = 0.46 | 62% |
| 9 | x = 0.64<br>y = 0.36 | 1.0 | hexane | reflux<br>30 min. | orange<br>solid | x = 0.56<br>y = 0.44 | 79% |
| 10 | x = 0.63<br>y = 0.37 | 0.56 | benzene | reflux<br>30 min. | orange<br>oil | x = 0.55<br>y = 0.45 | 72% |
| 11 | x = 0.63<br>y = 0.37 | 0.99 | benzene | reflux<br>30 min. | orange<br>solid | x = 0.46<br>y = 0.54 | 66% |

$^a$from 50 to 950° C.

H, CpZr). Calculated formula of [(MeSiH)$_{0.60}$(MeSi)$_{0.40}$].

Ceramic Yield (by TGA): 85% yield, black ceramic

A large scale tube furnace pyrolysis, employing the temperature program described in the general comments above, of 0.415 g of orange solid produced 0.327 g (79% yield) of a black ceramic.

Ceramic Analysis: C, 28.21; H, <0.5; Si, 65.42; Zr, 4.93.

Equivalent to 93.3% SiC+5.6% ArC+1.0% Si

XRD (d, Å): 2.53, 2.19, 1.54, 1.32, 0.89 ($\beta$-SiC) 2.72, 2.35, 1.66, 1.43 (ZrC)

EXAMPLES 14-17

By procedures similar to those employed in Examples 12 and 13 above and as specified in Table 2 below, the following reactions were conducted:

TABLE 2

Modification of (MeSiH)$_x$(MeSi)$_y$ with (Cp$_2$ZrH$_2$).

| Example Number | Starting Coefficients | Mole % Catalyst | Solvent | Conditions | Product | End Coefficients | Ceramic Yield (by TGA)$^a$ |
|---|---|---|---|---|---|---|---|
| 4 | x = 0.68 | 0.70 | hexane | reflux | orange | x = 0.58 | 71% |
|   | y = 0.32 |      |        | 2 hr.  | oil    | y = 0.42 |     |
| 15 | x = 0.68 | 0.96 | hexane | reflux | orange | x = 0.57 | 76% |
|    | y = 0.32 |      |        | 2 hr.  | oil    | y = 0.43 |     |
| 16 | x = 0.65 | 0.81 | hexane | UV     | orange | x = 0.62 | 78% |
|    | y = 0.35 |      |        | 2 hr.  | oil    | y = 0.38 |     |
| 17 | x = 0.65 | 1.6  | hexane | UV     | orange | x = 0.61 | 81% |
|    | y = 0.35 |      |        | 1 hr.  | solid  | y = 0.39 |     |

$^a$from 50 to 950° C.

small to integrate, CpZr), 6.0 (s, too small to integrate, CpZr). Calculated formula of [(MeSiH)$_{0.57}$(MeSi)$_{0.43}$]

Ceramic Yield (by TGA): 73% yield (50° to 940° C.), black ceramic

A large scale tube pyrolysis employing the temperature program described in the general comments above of 0.454 g of orange solid produced 0.322 g (71% yield) of a black ceramic.

Ceramic Analysis: C, 28.66; H, <0.5; Si, 68.26; Zr, 1.46.

Equivalent to 96.6% Sic+1.7% ZrC+1.7% Si

XRD (d, Å): 2.52, 2.17, 1.54, 1.31, 0.89 ($\beta$-SiC) 2.58, 2.47 (weak, unknown)

EXAMPLES 19-23

By procedures similar to those employed in Example 18 and as specified in Table 3 below, the following reactions were conducted and results obtained:

TABLE 3

Modification of (MeSiH)$_x$(MeSi)$_y$ with Cp$_2$ZrHCl.

| Example Number | Starting Coefficients | Mole % Catalyst | Solvent | Conditions | Product | End Coefficients | Ceramic Yield (by TGA)$^a$ |
|---|---|---|---|---|---|---|---|
| 19 | x = 0.65 | 0.98 | hexane | reflux | orange | x = 0.63 | 65% |
|    | y = 0.35 |      |        | 2 hr.  | oil    | y = 0.37 |     |
| 20 | x = 0.65 | 0.92 | toluene | reflux | white | x = 0.59 | 54% |
|    | y = 0.35 |      |         | 20 min. | oil  | y = 0.41 |     |
| 21 | x = 0.65 | 0.92 | toluene | reflux | orange | x = 0.60 | 74%$^b$ |
|    | y = 0.35 |      |         | 2 hr.  | solid  | y = 0.40 |        |
| 22 | x = 0.65 | 0.51 | toluene | reflux | yellow | x = 0.66 | 37%$^c$ |
|    | y = 0.35 |      |         | 3 hr.  | oil    | y = 0.34 |        |
| 23 | x = 0.65 | 0.92 | toluene | UV     | yellow | x = 0.64 | 48%$^d$ |
|    | y = 0.35 |      |         | 2 hr.  | oil    | y = 0.36 |        |

$^a$from 50 to 950° C.;
$^b$from 50 to 940° C.;
$^c$from 50 to 900° C.;
$^d$from 50 to 930° C.

EXAMPLE 18

Thermolysis reaction of 0.92 mol % (Cp$_2$ZrH$_2$)$_n$ in hexane.

The standard thermolysis procedure was carried out as generally described in the general comments above using the following reactants in the indicated amounts:
1.05 g (24.0 mmol) polysilane (x=0.65, y=0.35)
0.058 g (0.22 mmol) Cp$_2$ZrHCl
20 ml toluene The reaction mixture was warmed to a vigorous reflux for 3 hours, during which time the solution became clear and orange. Additional drying at 80° C. for 18 hours was required for complete drying of the residue. After drying, 1.100 g (99% yield based upon the weight of the reactants) of an orange solid was obtained.

$^1$H NMR (300 MHz, C$_6$D$_6$): $\delta_H$ 0 to 1.1 (broad, 5.32 H, SiCH$_3$), 3.6 to 4.4 (broad, 1.0 H, SiH), 5.8 (s, too

EXAMPLE 24

Photolysis reaction of 1.3 mol % (Cp$_2$ZrH$_2$)$_n$ in hexane.

The standard photolysis procedure was carried out as generally described in the general comments above using the following reactants in the indicated amounts:
0.45 g (10.3 mmol) polysilane (x=0.65, y=0.35)
0.028 g (0.13 mmol) Cp$_2$TiMe$_2$
8 ml hexane The Cp$_2$TiMe$_2$ was freshly prepared before use. The reaction mixture (in a 50 ml flask with a septum) was irradiated for 2 hours, during which time the solution became dark green. After drying, 0.471 g (99% yield based upon the weight of the reactants) of a dark green solid was obtained.

$^1$H NMR (300 MHz, C$_6$D$_6$): $\delta_H$ 0 to 1.1 (broad, 5.22 H, SiCH$_3$), 3.6 to 4.4 (broad, 1H, SiH), 5.97 (s, too small to integrate, Cp$_2$Ti).

Calculated formula of [(MeSiH)$_{0.58}$(MeSi)$_{0.42}$]

Ceramic Yield (by TGA): 70% yield, black ceramic

A large scale tube furnace pyrolysis, employing the temperature program described in the general comments above, of 0.293 g of dark green solid produced 0.209 g (71% yield) of a dark grey ceramic.

Ceramic Analysis: C, 28.67; H, <0.5; Si, 68.97; Ti, 1.45.

Equivalent to 95.4% SiC+1.8% TiC+2.8% Si

XRD (d, Å): 2.52, 2.18, 1.54, 1.31, 1.26, 1.00, 0.98, 0.89 ($\beta$-SiC) 2.65, 1.52 (weak, unknown)

EXAMPLE 25

Room temperature reaction of 1.3 mol % Cp$_2$TiMe$_2$ in hexane.

The following reactants were employed in the indicated amounts:

0.69 g (15.8 mmol) polysilane (x=0.65, y=0.35)
0.044 g (0.21 mmol) Cp$_2$TiMe$_2$
10 ml hexane The Cp$_2$TiMe$_2$ was freshly prepared before use. In a nitrogen filled dry box a 50 ml Schlenk flask equipped with a stir bar and a rubber septum was covered with aluminum foil to keep outlight and then was loaded with the polysilane and the catalyst. The foil-covered flask was then evacuated and backfilled with argon on a Schlenk line and hexane was added. The orange reaction mixture was stirred at room temperature for 24 hours. The solvent was then removed by trap-to-trap distillation at room temperature (0.05 mm Hg). The residue was dried at room temperature for 24 hours, during which time the product turned dark green. After drying, 0.734 g (100% yield based upon the weight of the reactants) of a dark green solid was obtained.

$^1$H NMR (300 MHz, C$_6$D$_6$): $\delta_H$ 0 to 1.1 (broad, 5.43 H, SiCH$_3$), 3.6 to 4.4 (broad, 1H, SiH). Calculated formula of [(MeSiH)$_{0.55}$(MeSi)$_{0.45}$]

Ceramic Yield (by TGA): 81% yield, black ceramic

A large scale tube furnace pyrolysis, employing the temperature program described in the general comments above, of 0.353 g of dark green solid produced 0.228 g (65% yield) of a dark grey ceramic.

Ceramic Analysis: C, 26.21; H, <0.5; Si, 70.00; Ti, 2.51.

Equivalent to 86.5% SiC+3.2% TiC+10.3% Si

XRD (d, Å): 2.52, 2.19, 1.54, 1.32, 1.00, 0.89 ($\beta$-SiC) 2.16 (TiC)

EXAMPLES 26-29

By procedures similar to those employed in Examples 24 and 25 above and as specified in Table 4 below, the following reactions were conducted and results obtained:

TABLE 4

Modification of (MeSiH)$_x$(MeSi)$_y$ with Cp$_2$TiMe$_2$.

| Example Number | Starting Coefficients | Mole % Catalyst | Solvent | Conditions | Product | End Coefficients | Ceramic Yield (by TGA)$^a$ |
|---|---|---|---|---|---|---|---|
| 26 | x = 0.65<br>y = 0.35 | 0.56 | hexane | UV<br>2 hr. | green oil | x = 0.64<br>y = 0.46 | 50% |
| 27 | x = 0.65<br>y = 0.35 | 1.3 | hexane conc. | RT<br>30 min. | green solid | x = 0.57<br>y = 0.43 | 80%$^b$ |
| 28 | x = 0.65<br>y = 0.35 | 0.54 | hexane | RT<br>24 hr. | green oil | x = 0.65<br>y = 0.35 | 63% |
| 29 | x = 0.65<br>y = 0.35 | 1.3 | hexane | reflux<br>2 hr. | green solid | x = 0.54<br>y = 0.46 | 85% |

$^a$from 50 to 950° C.;
$^b$from 50 to 900° C.

EXAMPLE 30

Room temperature reaction of 1.0 mol % Cp$_2$ZrCl$_2$/2BuLi in toluene.

The following reactants were employed in the indicated amounts:

0.78 g (17.8 mmol) polysilane (x=0.60, y=0.40)
0.052 g (0.178 mmol) Cp$_2$ZrCl$_2$
0.19 ml (2M, 0.38 mmol) nBuLi
6 ml toluene A 100 ml round-bottomed flask equipped with a magnetic stir-bar and a septum was charged with the polysilane in a nitrogen-filled dry box. The flask was evacuated and then back-filled and then 4 ml of toluene were introduced. A 25 ml round-bottomed flask equipped with a magnetic stir-bar and a septum was charged with the Cp$_2$ZrCl$_2$ in a nitrogen filled dry box. The flask was evacuated and then back-filled with argon and then 2 ml of toluene were introduced. The slurry was cooled in an ice bath. The nBuLi was added dropwise. The solution became bright yellow and then deep orange-red. After stirring at 0° C. for 5 minutes, the solution was transferred to the polysilane mixture with a cannula. The reaction mixture was stirred at room temperature for 2.5 hours, during which time the solution turned dark brown, but no precipitates were observed. Hexane was added (25 ml) and the solution turned bright yellow and yellow precipitates formed. The solution was filtered over celite in a Schlenk frit. Volatiles were removed by trap-to-trap distillation at 0.05 mm Hg. Hexane was added and the slurry was filtered again as described above. Volatiles were removed by trap-to-trap distillation at 0.05 mm Hg, and the polymer was dried for 24 hours at 0.05 mm Hg to give 0.820 g (99% yield based upon the weight of the reactants) of a yellow solid.

$^1$H NMR (300 MHz, C$_6$D$_6$): $\delta_H$ 0 to 1.1 (broad, 5.91 H, SiCH$_3$), 3.7 to 4.3 (broad, 1.0 H, SiH), 5.5 to 6.3 (broad, 0.08 H, CpZr). Calculated formula of [(HMeSi)$_{0.51}$(MeSi)$_{0.49}$].

Ceramic Yield (by TGA): 67% yield, black ceramic.

A large scale tube furnace pyrolysis, employing the temperature program described in the general comments above, of 0.275 g of yellow solid produced 0.130 g (47% yield) of a black ceramic.

Ceramic Analysis: C, --; H, --; Si, --; Zr, --; S=----% SiC+--% ZrC+--% Si

XRD (d, Å): 2.52, 2.18, 1.54, 1.31, 0.89, ($\beta$-SiC) 2.48, (unknown)

EXAMPLES 31-34

By procedures similar to those employed in Example 30 above and as specified in Table 5 below, the following reactions were conducted and results obtained:

TABLE 5

Modification of $(MeSiH)_x(MeSi)_y$ with $Cp_2ZrCl_2/2BuLi$.

| Example Number | Starting Coefficients | Mole % Catalyst | Solvent | Conditions | Product | Yield | End Coefficients | Ceramic Yield (by TGA)[a] |
|---|---|---|---|---|---|---|---|---|
| 31 | x = 0.60<br>y = 0.40 | 1.0 | toluene | 97° C.<br>2.5 hr. | yellow solid | 38% | x = 0.41<br>y = 0.59 | 57% |
| 32 | x = 0.60<br>y = 0.40 | 1.0 | toluene | 97° C.<br>1.5 hr. | yellow solid | 47% | x = 0.41<br>y = 0.59 | 53% |
| 33 | x = 0.60<br>y = 0.40 | 1.0 | toluene | RT<br>30 min. | yellow solid | 99% | x = 0.50<br>y = 0.50 | 59% |
| 34 | x = 0.62<br>y = 0.38 | 1.0 | toluene | RT<br>2.5 hr. | orange solid | 77% | x = 0.40<br>y = 0.60 | 53% |

[a] from 50 to 950° C.

EXAMPLES 35-56

Modification of the polymer $(MeSiH)_{0.52}(MeSi)_{0.29}(PhSiH)_{0.10}(PhSi)_{0.08}$ with $(Cp_2ZrH_2)_n$.

The title polymer was prepared and modified by the standard thermolysis procedure as generally described in the general comments above using $(Cp_2ZrH_2)_n$ as a catalyst and under the conditions specified in Table 6 below:

TABLE 6

Modification of $(MeSiH)_{0.52}(MeSi)_{0.29}(PhSiH)_{0.10}(PhSi)_{0.08}$

| Example Number | Mole % Catalyst | Solvent | Conditions | Product | End Coefficients | Ceramic Yield (by TGA)[a] |
|---|---|---|---|---|---|---|
| 35 | 0.48 | hexane | reflux<br>2 hr. | orange oil | x = 0.48<br>y = 0.34<br>z = 0.10<br>w = 0.07 | 41% |
| 36 | 0.98 | hexane | reflux<br>2 hr. | orange oil | x = 0.46<br>y = 0.35<br>z = 0.10<br>w = 0.09 | 45% |

[a] from 50 to 950° C.

EXAMPLE 37

Photolysis reaction of $(MeSiH)_x(MeSi)_6(PhSiH)_z(PhSi)_2$ with 1.8 mol % $Cp_2ZrH_2)_n$ in hexane.

The standard photolysis procedure was carried out as generally described in the general comments above using the following reactants in the indicated amounts:
0.80 g (14.6 mmol) of the title polysilane (x=0.52, y=0.29, z=0.10, w=0.08)
0.068 g (0.270 mmol) $Cp_2ZrMe_2$
18 ml hexane The reaction mixture (in a 25 ml flask with a septum) was irradiated for 2 hours, during which time the solution became clear and orange. After drying, 0.855 g (98% yield based upon the weight of the reactants) of an orange, cloudy oil was obtained.

$^1H$ NMR (300 MHz, $C_6D_6$): $\delta_H$ −0.2 to 1.1 (broad, 21.0 H, SiMe), 3.4 to 4.45 (broad, 4.7 H, MeSi$\underline{H}$), 4.45 to 5.2 (broad, 1H, PhSi$\underline{H}$), 5.7 to 6.2 (m, 1.1 H, Cp), 6.8 to 8.1 (two broad peaks, 7.8 H, SiPh). Calculated formula of $[(MeSiH)_{0.55}(MeSi)_{0.27}(PhSiH)_{0.12}(PhSi)_{0.07}]$ Ceramic Yield (by TGA): 59% yield (to 950° C.), black ceramic

EXAMPLE 38

Modification of $(MeSiH)_{0.52}(MeSi)_{0.29}(PhSiH)_{0.10}(PhSi)_{0.08}$.

By procedure similar to those employed in Example 37 above as specified below, the following reaction was conducted and the indicated result obtained:

| Mole % Catalyst | Solvent | Conditions | Product | End Coefficients | Ceramic Yield (by TGA)[a] |
|---|---|---|---|---|---|
| 0.92 | hexane | UV<br>2 hr. | orange oil | x = 0.50<br>y = 0.32<br>z = 0.10<br>w = 0.08 | 48% |

[a] from 50 to 950° C.

EXAMPLES 39-40

Modification of $(MeSiH)_{0.52}(MeSi)_{0.29}(PhSiH)_{0.10}(PhSi)_{0.08}$ with $Cp_2ZrHCl$.

The title polymer was prepared and modified by the standard thermolysis procedure as generally described above the general comment, using $Cp_2ZrHCl$ as a catalyst and under the conditions specified in Table 7 below.

TABLE 7

$(MeSiH)_{0.52}(MeSi)_{0.29}(PhSiH)_{0.10}(PhSi)_{0.08}$ with $Cp_2ZrHCl$.

| Example Number | Mole % Catalyst | Solvent | Conditions | Product | End Coefficients | Ceramic Yield (by TGA)[a] |
|---|---|---|---|---|---|---|
| 39 | 0.74 | toluene | reflux<br>3 hr. | white oil | x = 0.48<br>y = 0.34<br>z = 0.08 | 39% |

TABLE 7-continued (MeSiH)$_{0.52}$(MeSi)$_{0.29}$(PhSiH)$_{0.10}$(PhSi)$_{0.08}$ with Cp$_2$ZrHCl.

| Example Number | Mole % Catalyst | Solvent | Conditions | Product | End Coefficients | Ceramic Yield (by TGA)$^a$ |
|---|---|---|---|---|---|---|
| 40 | 1.5 | toluene | reflux 3 hr. | orange oil | w = 0.10<br>x = 0.56<br>y = 0.25<br>z = 0.12<br>w = 0.07 | 44% |

$^a$from 50 to 950° C.

Each of the references cited herein is incorporated herein by reference.

This invention has been described in detail with reference to the preferred embodiments thereof. However, it will be appreciated that those skilled in the art, upon consideration of this disclosure, may make modifications and improvements within the spirit and scope of the invention.

We claim:

1. A modified preceramic polymer material prepared by a method comprising:
   (a) mixing one or more organosilicon polymers each having a plurality of Si—H functional groups with
   (b) a catalytically effective amount of a metallocene compound sufficient to cause a dehydrogenative crosslinking reaction; and
   (c) allowing the mixture to undergo the dehydrogenative reaction to form the modified polymer material.

2. The modified polymer material of claim 1 wherein the organopolysilanes have a plurality of tertiary Si—H groups.

3. The modified polymer material of claim 1 wherein the dehydrogenative crosslinking reaction is initiated by exposure to activating radiation.

4. The modified polymer material of claim 3 wherein the dehydrogenative crosslinking reaction if initiated by exposure to ultraviolet radiation.

5. The modified polymer material of claim 1 wherein the dehydrogenative crosslinking reaction is thermally initiated.

6. The modified polymer material of claim 5 where the mixture is heated in solution for a temperature and time sufficient for the dehydrogenative crosslinking reaction to occur.

7. The modified polymer material of claim 1 wherein the dehydrogenative crosslinking reaction is initiated by mixing the organopolysilanes and metallocene compound for a sufficient time at room temperature.

8. The modified polymer material of claim 1 wherein the organopolysilanes each have a carbon to silicon molar ratio of about 1.

9. The modified polymer material of claim 2 wherein the organopolysilanes each have a carbon to silicon molar ratio of about 1.

10. The modified polymer material of claim 1 wherein the organosilicon polymer has a plurality of repeat units of the formula $[(RSiH)_x(R^1Si)_y]_n$ where R and $R^1$ are independently selected from the group consisting of substituted or unsubstituted lower alkyl having from 1 to about 8 carbon atoms, substituted or unsubstituted cycloalkyl having from 3 to about 10 carbon atoms, and substituted or unsubstituted aryl having from 6 to about 10 carbon atoms, x being greater than zero and x+y=1.

11. The modified polymer material of claim 10 wherein the coefficient x has a value of from about 0.3 to 1.0 and the coefficient y has a value of from about 0.7 to 0.

12. The modified polymer material of claim 10 wherein the coefficient x has a value of from about 0.6 to 0.9 and the coefficient y has a value of from about 0.4 to 0.1.

13. The modified polymer material of claim 10 wherein the coefficient x has a value of from about 0.60 to 0.80 and the coefficient y has a value of from about 0.40 to 0.20.

14. The modified polymer material of claim 10 where R is substituted or unsubstituted lower alkyl having from 1 to about 8 carbon atoms.

15. The modified polymer material of claim 10 where R is methyl.

16. The modified polymer material of claim 15 wherein the coefficient x has a value of from about 0.3 to 1.0 and the coefficient y has a value of from about 0.7 to 0.

17. The modified polymer material of claim 15 wherein the coefficient x has a value of from about 0.60 to 0.80 and the coefficient y has a value of from about 0.40 to 0.20.

18. The modified polymer material of claim 1 wherein the metallocene compound is selected from the group consisting of the following formulas (I), (II) and (III):

$$(R^3{}_nC_5H_{5-n})_2M'R^4 \quad \text{(I)}$$

$$(R^3{}_nC_5H_{5-n})_2M'R^5R^6 \quad \text{(II)}$$

$$(R^3{}_nC_5H_{5-n})_2V \quad \text{(III)}$$

wherein each $R^3$ on a $C_5H_{5-n}$ ring is independently selected from the group consisting of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, substituted or unsubstituted aryl of from 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or substituted or unsubstituted aryl having from 6 to 10 carbon atoms, or two $R^3$ groups taken together form an aromatic ring fused to said $C_5H_{5-n}$ ring;

$R^4$, $R^5$ and $R^6$ are each independently selected from the group consisting of hydrogen, halogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, substituted or unsubstituted aryl having from about 6 to about 10 carbon atoms, and a group of formula R'$_3$Si where each R' group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or substituted or unsubstituted aryl having from about 6 to about 10 carbon atoms;

M' is selected from the group consisting of Ti, Zr, Sc, Y, La, Ce, Pr, Nd, Pm, Sm, Eu, Gd, Tb, Dy, Ho, Er, Tm, Yb, and Lu; M" is selected from the group consisting of Ti, Zr and Hf; and n is an integer of from 0 to 5.

19. The modified polymer material of claim 1 wherein the metallocene compound has the formula $(R^3_nC_5H_{5-n})_2M'R^4$ wherein each $R^3$ is independently selected from the group consisting of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 10 carbon atoms, aryl or substituted aryl having from 6 to about 10 carbon atoms, and a group of formula R'$_3$Si where each R' group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or aryl or substituted aryl having from 6 to 10 carbon atoms, or two $R^3$ groups taken together form an aromatic ring fused to said $C_5H_{5-n}$ ring;

$R^4$ is selected from the group consisting of hydrogen, halogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, aryl or substituted aryl having from about 6 to about 10 carbon atoms, and a group of formula R'$_3$Si where each R' group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or aryl or substituted aryl having from about 6 to about 10 carbon atoms;

M' is selected from the group consisting of Ti, Zr, Sc, Y, La, Ce, Pr, Nd, Pm, Sm, Eu, Gd, Tb, Dy, Ho, Er, Tm, Yb, and Lu;

and n is an integer of from 0 to 5.

20. The modified polymer material of claim 19 wherein M' is a lanthanide metal.

21. The modified polymer of claim 19 wherein n is 0 or 1.

22. The modified polymer material of claim 1 wherein the metallocene compound has the formula $(R^3_nC_5H_{5-n})_2M''R^4R^5$ wherein each $R^3$ is independently selected from the group consisting of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, aryl or substituted aryl having from 6 to about 10 carbon atoms, and a group of formula R'$_3$Si where each R' group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or aryl or substituted aryl having from 6 to about 10 carbon atoms, or two $R^3$ groups taken together form an aromatic ring fused to said $C_5H_{5-n}$ ring;

$R^4$ and $R^5$ are each independently selected from the group consisting of hydrogen, halogen, substituted or unsubstituted lower alkyl having from 1 to about 8 carbon atoms, substituted or unsubstituted cycloalkyl having from 2 to about 10 carbon atoms, substituted or unsubstituted lower alkenyl having from 2 to about 8 carbon atoms, aryl or substituted aryl having from 6 to about 10 carbon atoms, and a group of formula R'$_3$Si where each R' group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 1 to about 8 carbon atoms, or aryl or substituted aryl having from 6 to about 10 carbon atoms; and M" is selected from the group consisting of Ti, Zr and Hf; and n is an integer of from 0 to 5.

23. The modified polymer of claim 22 wherein n is 0 or 1.

24. The modified polymer material of claim 1 wherein the metallocene compound has a formula $(R^3_nC_5H_{5-n})_2V$ wherein each $R^3$ is independently selected from the group consisting of hydrogen, substituted or unsubstituted lower alkyl of from 1 to about 6 carbon atoms, substituted or unsubstituted cycloalkyl of from 3 to about 10 carbon atoms, substituted or unsubstituted lower alkenyl of from 2 to about 6 carbon atoms, aryl or substituted aryl of from 6 to about 10 carbon atoms, and a group of formula R'$_3$Si where each R' group is independently selected from the group consisting of hydrogen, substituted or unsubstituted lower alkyl of from 1 to about 6 carbon atoms, substituted or unsubstituted cycloalkyl of from 3 to about 10 carbon atoms, substituted or unsubstituted lower alkenyl of from 2 to about 6 carbon atoms, and aryl or substituted aryl of from 6 to 10 carbon atoms, or two $R^3$ groups taken together form an aromatic ring fused to said $C_5H_{5-n}$ ring; and n is an integer of from 0 to 5.

25. The modified polymer material of claim 24 wherein n is 0 or 1.

26. The modified polymer of claim 1 where the metallocene compound is selected from the group consisting of $(\eta-C_5H_5)_2Ti(CH_3)_2$, $(\eta-C_5H_5)_2Zr(CH_3)_2$, $(\eta-C_5H_5)_2Zr(n-C_4H_9)_2$, $(\eta-C_5H_5)_2Hf(CH_3)_2$, and $[(\eta-C_5H_5)_2ZrH_2]_n$.

27. The modified polymer material of claim 1 where the metallocene compound is generated in situ.

28. The modified polymer material of claim 1 where the amount of the metallocene compound is from about 0.20 to 3.0 mole percent of the organopolysilane.

29. The modified polymer material of claim 1 where the amount of the metallocene compound is from about 0.40 to 2.0 mole percent of the organopolysilane.

30. The modified polymer material of claim 1 where the amount of the metallocene compound is from about 0.45 to 1.75 mole percent of the organopolysilane.

31. The modified polymer material of claim 1 wherein the amount of the metallocene compound is from about 0.50 to 1.0 mole percent of the organopolysilane.

32. The modified polymer material of claim 1 wherein the dehydrogenative crosslinking reaction is carried out in an organic solvent.

33. The modified polymer material of claim 32 wherein the organic solvent is selected from the group consisting of paraffinic hydrocarbon solvents and aromatic hydrocarbon solvents.

34. The modified polymer material of claim 1 wherein the dehydrogenative crosslinking reaction is carried out in the an environment substantially free of moisture and oxygen.

35. The modified polymer material of claim 1 where one or more of the organopolysilanes is the condensation product of $R^1SiHCl_2$, wherein $R^1$ is selected from the group consisting of substituted or unsubstituted lower alkyl having 1 to about 8 carbon atoms, substituted or unsubstituted lower alkenyl having from 2 to about 8 carbon atoms, and substituted or unsubstituted aryl having from 6 to about 10 carbon atoms.

36. The modified polymer material of claim 35 where $R^1$ is $CH_3$.

37. The modified polymer material of claim 35 where the organopolysilane is a product of an alkali metal-based condensation.

38. The modified polymer material of claim 1 where one or more of the organopolysilanes is the condensation product of mixtures of $R^1SiHCl_2$ and $R^2SiHCl_2$, wherein $R^1$ is selected from the group consisting of substituted or unsubstituted lower alkyl having 1 to about 8 carbon atoms, substituted and unsubstituted lower alkenyl having from 2 to about 8 carbon atoms, and substituted or unsubstituted aryl having from 6 to about 10 carbon atoms, and $R^2$ is defined the same as $R^1$ and may be the same or different than $R^1$, or two $R^2$ groups taken together form a silicon containing ring having from 2 to about 7 methylene groups.

39. The modified polymer material of claim 38 where $R^1$ and $R^2$ are each $CH_3$.

40. The modified polymer material of claim 38 where the organopolysilane is a product of an alkali metal-based condensation.

41. The modified polymer material of claim 1 where one or more of the organopolysilanes is the condensation product of mixtures of $R^1SiHCl_2$ and $(R^2)_2SiCl_2$, wherein $R^1$ is selected from the group consisting of substituted or unsubstituted lower alkyl having 1 to about 8 carbon atoms, substituted and unsubstituted lower alkenyl having from 2 to about 8 carbon atoms, and substituted or unsubstituted aryl having from 6 to about 10 carbon atoms, and $R^2$ is defined the same as $R^1$ and may be the same or different than $R^1$, or two $R^2$ groups taken together to form a silicon containing ring having from 2 to about 7 methylene groups.

42. The modified polymer material of claim 41 where $R^1$ and $R^2$ are each $CH_3$.

43. The modified polymer material of claim 41 where the organopolysilane is a product of an alkali metal-based condensation.

44. The modified polymer material of claim 1 wherein the organopolysilane is the condensation product of mixtures of $R^1SiHCl_2$, $R^2SiHCl_2$ and $(R^2)_2SiCl_2$, wherein $R^1$ is selected from the group consisting of substituted or unsubstituted lower alkyl having 1 to about 8 carbon atoms, substituted and unsubstituted lower alkenyl having from 2 to about 8 carbon atoms, and substituted or unsubstituted aryl having from 6 to about 10 carbon atoms, and $R^2$ is defined the same as $R^1$ and may be the same or different than $R^1$, or two $R^2$ groups taken together form a silicon containing ring having from 2 to about 7 methylene groups.

45. The modified polymer material of claim 44 where $R^1$ and $R^2$ are each $CH_3$.

46. The modified polymer material of claim 44 where the organopolysilane is a product of an alkali metal-based condensation.

47. The modified polymer material of claim 18 where one or more of the groups $R^4$, $R^5$ and $R^6$ is substituted or unsubstituted benzyl.

48. The modified polymer material of claim 19 where one or more of the groups $R^4$, $R^5$ and $R^6$ is substituted or unsubstituted benzyl.

49. The modified polymer material of claim 22 where one or more of the groups $R^4$, $R^5$ and $R^6$ is substituted or unsubstituted benzyl.

50. A modified preceramic polymer material prepared by a method comprising:
   (a) mixing one or more organosilicon polymers each having a plurality of Si—H functional groups with
   (b) a catalytically effective amount of a metallocene compound sufficient to cause a dehydrogenative crosslinking reaction; and
   (c) allowing the mixture to undergo the dehydrogenative reaction to form the modified polymer material,
wherein the metallocene compound is selected from the group consisting of the following formulas (I), (II) and (III):

$$(R^3{}_nC_5H_{5-n})_2M'R^4 \qquad (I)$$

$$(R^3{}_nC_5H_{5-n})_2M''R^5R^6 \qquad (II)$$

$$(R^3{}_nC_5H_{5-n})_2V \qquad (III)$$

wherein each $R^3$ on a $C_5H_{5-n}$ ring is independently selected from the group consisting of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, substituted or unsubstituted aryl of from 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or substituted or unsubstituted aryl having from 6 to 10 carbon atoms, or two $R^3$ groups taken together form an aromatic ring fused to said $C_5H_{5-n}$ ring;

$R^4$, $R^5$ and $R^6$ are each independently selected from the group consisting of hydrogen, halogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, substituted or unsubstituted aryl having from about 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or substituted or unsubstituted aryl having from about 6 to about 10 carbon atoms;

$M'$ is selected from the group consisting of Ti, Zr, Sc, Y, La, Ce, Pr, Nd, Pm, Sm, Eu, Gd, Tb, Dy, Ho, Er, Tm, Yb, and Lu; $M''$ is selected from the group consisting of Ti, Zr and Hf; and n is an integer of from 0 to 5.

51. The modified polymer material of claim 50 wherein one or more of the groups $R^4$, $R^5$ and $R^6$ is substituted or unsubstituted benzyl.

52. The modified polymer material of claim 50 wherein the metallocene compound has the formula $(R^3{}_nC_5H_{5-n})_2M'R^4$ wherein each $R^3$ is independently selected from the group consisting of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 10 carbon atoms, aryl or substituted aryl having from 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or aryl or substituted aryl having from 6 to 10 carbon atoms, or two $R^3$ groups taken together form an aromatic ring fused to said $C_5H_{5-n}$ ring;

$R^4$ is selected from the group consisting of hydrogen, halogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, aryl or substituted aryl having from about 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or aryl or substituted aryl having from about 6 to about 10 carbon atoms;

$M'$ is selected from the group consisting of Ti, Zr, Sc, Y, La, Ce, Pr, Nd, Pm, Sm, Eu, Gd, Tb, Dy, Ho, Er, Tm, Yb, and Lu;

and n is an integer of from 0 to 5.

53. The modified polymer material of claim 52 where one or more of the groups $R^4$, $R^5$ and $R^6$ is substituted or unsubstituted benzyl.

54. The modified polymer material of claim 50 wherein the metallocene compound has the formula $(R^3{}_nC_5H_{5-n})_2M''R^4R^5$ wherein each $R^3$ is independently selected from the group consisting of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, aryl or substituted aryl having from 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, or aryl or substituted aryl having from 6 to 10 carbon atoms, or two $R^3$ groups taken together form an aromatic ring fused to said $C_5H_{5-n}$ ring;

$R^4$ and $R^5$ are each independently selected from the group consisting of hydrogen, halogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, aryl or substituted aryl having from 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl or aryl or substituted aryl having from 6 to about 10 carbon atoms, and $M''$ is selected from the group consisting of Ti, Zr and Hf; and n is an integer of from 0 to 5.

55. The modified polymer material of claim 54 where one or more of the groups $R^4$, $R^5$ and $R^6$ is substituted or unsubstituted benzyl.

56. The modified polymer material of claim 50 wherein the metallocene compound has a formula $(R^3{}_nC_5H_{5-n})_2V$ wherein $R^3$ is independently selected from the group consisting of hydrogen, substituted or unsubstituted lower alkyl having from 1 to about 8 carbon atoms, substituted or unsubstituted cycloalkyl having from 3 to about 10 carbon atoms, substituted or unsubstituted lower alkenyl having from 2 to about 8 carbon atoms, aryl or substituted aryl having from 6 to about 10 carbon atoms, and a group of formula $R'_3Si$ where each $R'$ group is independently selected from the group of hydrogen, substituted or unsubstituted lower alkyl having from 1 to about 8 carbon atoms, substituted or unsubstituted cycloalkyl having from 3 to about 10 carbon atoms, substituted or unsubstituted lower akenyl having from 2 to about 8 carbon atoms, or aryl or substituted aryl having from 6 to 10 carbon atoms, or two $R^3$ groups taken together form an aromatic ring fused to said $C_5H_{5-n}$ ring; and n is an integer from 0 to 5.

* * * * *